Jan. 13, 1942.   C. W. BROOKS   2,269,434
AUTOMATIC TRANSMISSION MECHANISM
Filed Nov. 18, 1940

VOLTMETER SWITCH

Inventor
Cuyler W. Brooks
By Francis C. Vanderwerf
Attorney

Patented Jan. 13, 1942

2,269,434

UNITED STATES PATENT OFFICE 2,269,434

AUTOMATIC TRANSMISSION MECHANISM

Cuyler W. Brooks, Pittsburgh, Pa.

Application November 18, 1940, Serial No. 366,197

5 Claims. (Cl. 171—231)

(Granted under the act of March 3, 1883, as amended April 30, 1928; 370 O. G. 757)

This invention described herein may be manufactured and used by or for the Government for governmental purposes, without the payment to me of any royalty thereon.

This invention relates generally to transmission mechanisms, but more particularly to a transmission device adapted to effect a constant speed drive from a variable speed power source.

One object of the invention is to provide a transmission mechanism by which the ratio between the speed of the driving and driven member is automatically adjusted to furnish a constant speed output of power.

Another object of the invention is to provide a variable speed transmission of the friction type which is comparatively inexpensive of construction, simple and efficient in operation and one which is entirely automatic and capable of effecting a wide variation in ratios between the speeds of the driving and driven members.

Another object of the invention is to provide a variable speed transmission which permits a gradual change in the ratio of the speeds of the driving and driven members and without shock to the apparatus.

With these and other objects in view this invention consists in certain novel details of construction, combination and arrangement of parts which will be more fully described and claimed.

Referring more particularly to the accompanying drawing in which corresponding parts are indicated by similar reference characters:

Briefly stated, the device which forms the subject matter of this application comprises an electrically controlled friction driven transmission mechanism adapted to receive power from a variable source and deliver the same at a constant output.

Figure 1:
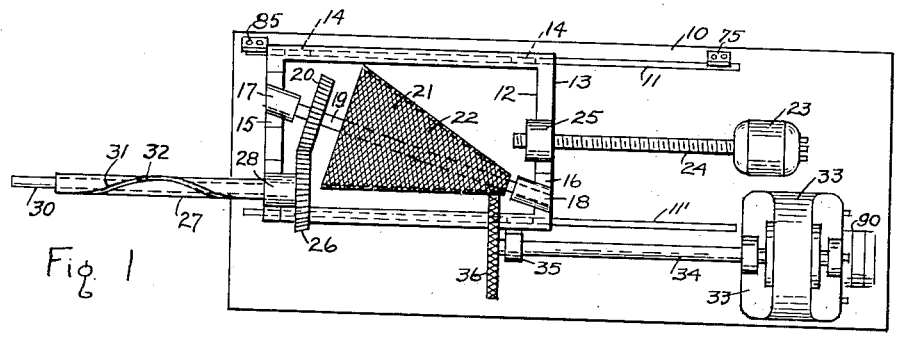
Fig. 1 is a top plan view of the transmission mechanism.

Referring to the figures, the numeral 10 indicates a base, provided with parallel longitudinal grooves or tracks 11 and 11', upon which is mounted a longitudinal movable carriage 12 comprising a rectangular frame 13 provided with rollers 14 which fit within said grooves or tracks. Upon the frame 13 are mounted standards 15 and 16 provided with bearings 17 and 18 within which is rotatably mounted a jack shaft 19 diagonally disposed in relation to the rectangular contour of said frame, as shown in Fig. 1. Upon the jack shaft 19 are keyed a beveled gear 20 and a cone 21 provided with a rubber knurled friction surface 22. The frame 13 on which the cone 21 is mounted, is moved longitudinally across the base 10 by means of an electric motor 23 provided with a longitudinally extending threaded shaft 24 which engages an internally threaded member 25 rigidly attached to one end of the frame. The beveled gear 20 which is keyed to the jack shaft meshes with a similar gear 26 keyed to a sleeve 27 which is rotatably mounted within a bearing 28 supported by a standard 29 attached to the frame 13. The sleeve 27 is slidably mounted upon a drive shaft 30 connected with a source of power (not shown) such as the shaft of an engine of a motor vehicle, or a truck axle of a railroad car, is provided with a spiral spline 31 which engages a pin 32 projecting from said shaft. This sleeve connection with the drive shaft permits the longitudinal movement of the carriage 12 without disconnecting the gear 26 from the power driven shaft 30 or from meshing with the gear 20. Attached to one end of the base 10 is a generator 33 provided with an elongated longitudinally disposed armature shaft 34 which is mounted within a bearing member 35 and to which is keyed a friction wheel 36 adapted to frictionally engage the rubber surface 22 of the cone 21.

It will be noted that with this device, power from the drive shaft 30 can be transmitted through the beveled gears 26 and 20, cone 21, friction wheel 36 and shaft 34 to the generator 33.

Change in the ratio of the rotative velocities between the drive and driven shafts can be effected by changing the position of engagement of the wheel 36 with the cone 21, so that varying velocities of the drive shaft 30 can be transmitted to effect a constant velocity in the driven shaft 34 to thus effect a uniform output from the generator 33.

In order that the armature shaft 34 of the generator 33 may be rotated at a constant velocity regardless of any change in velocity of the drive shaft 30, the motor 23 is provided to effect a longitudinal movement of the frame 12, through rotation of its threaded shaft 24 which engages the threaded member 25 attached to said frame. Thus the clockwise or anticlockwise rotation of the motor shaft 24 increases and decreases the ratio between the velocity of the power shaft 30 and the driven armature shaft 34 of the generator to thereby effect a constant current output.

To effect the movement of the carriage 12 so that the generator will be rotated at a constant velocity regardless of the velocity of the drive or power shaft 30, the motor 23 which is operated by power from the generator is controlled by a contact making voltmeter 37 and magnetic switches 54 and 64. The movement of the carriage 12 is limited at either end of its travel by switches 75 and 85 which break the current to the motor 23 to thus prevent overrunning its predetermined limits.

In the accompanying drawing the electrical system has been shown as of the three phase type, however, a single phase system or a direct current system may be adapted. In order to adjust the position of the friction wheel 36 along the cone 21 so that the output from the generator will be constant the two solenoid or magnetic switches 54 and 64 and the voltmeter or voltage responsive switch 37 are utilized.

Figure 2:
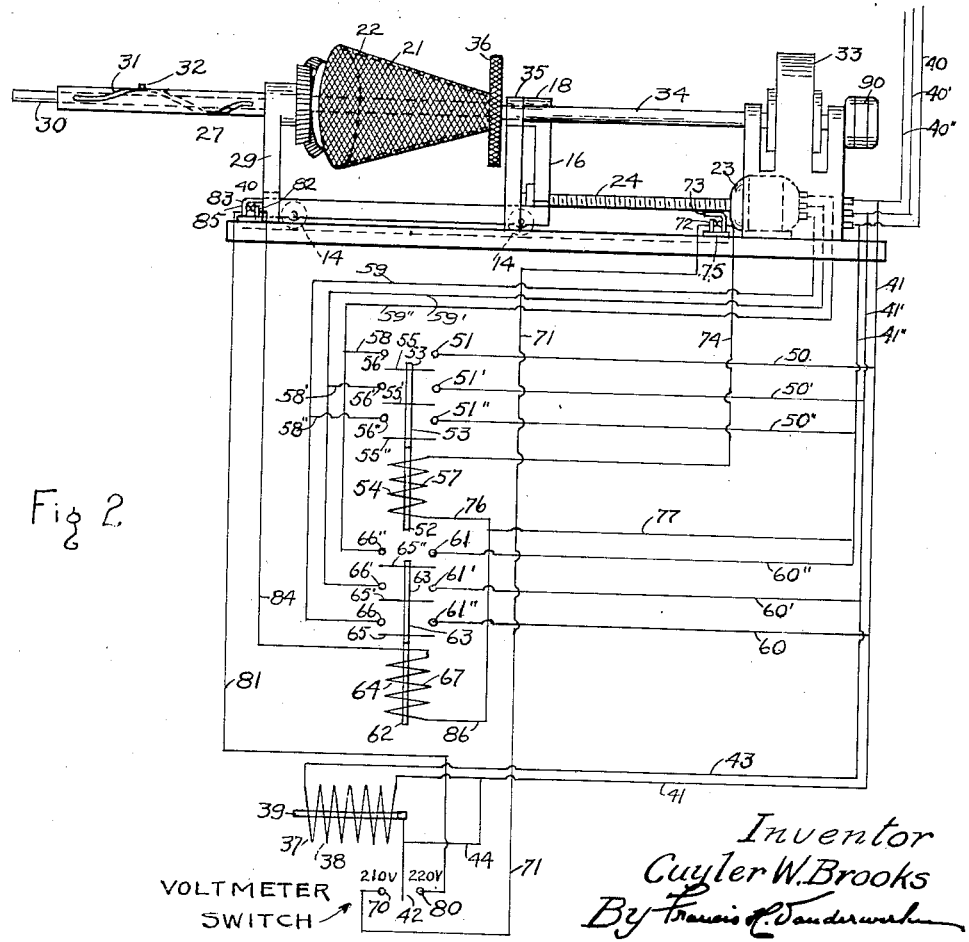
Fig. 2 is a side elevation of the transmission mechanism with a diagrammatic outline of the electrical control apparatus connected therewith.

Referring to Fig. 2, it will be noted that the power leads from the generator 33 are indicated by the numerals 40, 40' and 40". To these leads are connected conductors 41, 41' and 41" from which conductors 50, 50' and 50" lead to the terminals 51, 51' and 51" of the solenoid switch 54. The solenoid switch 54 is composed of a central member comprising a lower iron core 52 with an upwardly extending insulating portion 53 on which are mounted blades 55, 55' and 55". The core is mounted so as to be vertically movable within the energizing coil 57, as shown diagrammatically.

The blades 55, 55' and 55" are adapted to complete circuits from terminals 51, 51' and 51", to the terminals 56, 56' and 56" from which the conductors 58, 58' and 58" and 59, 59' and 59" lead to the motor 23 so that current from the generator will rotate the same in a clockwise direction and thus move the carriage to the right to increase the relative speed of the generator with respect to that of the power shaft 30 when there is a decrease in the speed of the latter. In the same manner the power leads 40, 40' and 40" of the generator 33 are connected through leads 41, 41' and 41" and 60, 60' and 60" to the terminals 61, 61' and 61" of the solenoid switch 64.

The solenoid switch 64 is similar to switch 54, and is provided with blades 65, 65' and 65" which are attached to the insulating portion 63 of a core member, the lower iron portion 62 of which is surrounded by an energizing coil 67. The blades are adapted to complete the circuits from terminals 61, 61' and 61" to the terminals 66, 66' and 66", the latter being connected respectively to conductors 59, 59' and 59", which are connected to the motor 23 so that current from the generator will cause the rotation of the motor in an anticlockwise direction and thus move the carriage to the left to decrease the relative speed of the generator with respect to that of the power shaft 30 when there is an increase in the speed of the latter.

The automatic actuation of the solenoid switches 54 and 64 is caused by energization of the coils 57 and 67 which are controlled by the voltmeter or voltage actuated switch 37 which comprises a coil 38 connected to the generator through conductors 41, 41' and 43. Within the coil 38 is slidably mounted a core 39 to which is attached a contact member 42 conductively connected through the conductor 44 to conductor 41. The contact member 42 is mounted between two contact terminals 70 and 80 and is moved to one or the other depending on the voltage of the energizing coil 38.

The contact terminal 70 is adapted to complete a circuit to energize solenoid coil 54 and the contact terminal 80 is adapted to complete a circuit through the solenoid 64, thus effecting the automatic control of the motor 23 to move the cone to the right or to the left.

The circuit which is completed on the contact of the member 42 with the terminal 70 is from the generator lead 40 through conductor 41, conductor 44, contact member 42 to terminal 70 and through conductor 71 to the contacts 72 and 73 of limit switch 75, and then through conductor 74, coil 57 and from the coil 57 through conductors 76 and 77 to conductor 41" and generator lead conductor 40".

When the member 42 of the voltmeter moves into contact with the terminal 80 a circuit is completed from the generator 33 through lead 40, conductor 41, conductor 44, contact member 42 to terminal 80 and thence through conductor 81, contacts 83, 82 of contact switch 85, conductor 84, coil 64, conductors 86 and 77 to conductor 41" and generator lead 40".

As an example to illustrate the operation of the device, let it be assumed that generator 33 is 1 K. W. 220 volts, 3 phase, 1800 R. P. M. and that motor 23 is ⅙ H. P., 220 volts, 3 phase, 1200 R. P. M. geared down to 200 R. P. M. Shaft 30 has been turning at 1800 R. P. M., generator 33 has a voltage of 218, and the carriage 12 is stationary at a point where friction disc or wheel 36 contacts the cone 21 where the circumferences of each are equal. Shaft 30 now drops to 1200 R. P. M., the speed of generator 33 drops also lowering the voltage. When the voltage reaches a value of 210 volts, contact-making voltmeter 37 which is calibrated and adjusted to close contacts 42 and 80 when the generated voltage reaches a value above 220 volts, closes contacts 42 and 70 which energizes solenoid 54, closing the main contacts to motor 23 which is connected for a rotation of screw shaft 24 so as to move carriage 12 and cone 21 forward. When the position is reached that at the point of contact the circumference of cone 21 is of sufficient ratio to disc or wheel 36 to give a speed of such R. P. M. as is required by generator 33 to generate a voltage above 210 volts, then contact making voltmeter 37 will open contacts 42 and 70 in turn deenergizing solenoid 54 of magnetic contactor 19 and disconnecting motor 23 from the power supply. Generated voltage does not necessarily return to its original value as this will depend upon the operation of the primary drive, but the voltage is held at all times above 210 volts and below 220 volts which is ample regulation for three phase equipment. It is obvious from the drawing that this cycle is reversible and fully automatic. There would then be available approximately 1 H. P. for use by whatever equipment was involved. If as in the case of a compressor, the operation of which would not be continuous, the demand was automatically disconnected, this operation could also open a switch (not shown) in the field of the exciter 90 which would permit generator 33 to run idle.

Having described my invention, what I claim as new and wish to secure by Letters Patent is:

1. An automatically controlled transmission mechanism including a carriage, a cone rotatably mounted on said carriage, an extensible coupling connecting said cone to a drive shaft, a disc in frictional engagement with said cone, a generator driven by said disc, a reversible motor electrically connected to said generator, means connected to said motor to effect the movement of said carriage, means operated by said generator to effect the directional rotation of said motor, and means affected by the voltage of said generator to control said last mentioned means.

2. An automatically controlled transmission mechanism comprising a base, a carriage longitudinally movable on said base, a cone provided with a friction surface, rotatably mounted on said carriage, means including an extensible coupling for connecting said cone to a drive shaft, a generator mounted on said base, a disc, provided with a friction surface, keyed to the armature shaft of said generator and in frictional engagement with said cone, a motor mounted on said base and connected with said carriage so as to effect the longitudinal movement thereof in either direction and to thereby change the velocity ratio between the cone and the disc, circuits electrically coupling the generator to said motor, solenoid switches for controlling said circuits, a voltmeter switch electrically connected to and actuated by said generator, and circuits connecting the voltmeter switch for actuation of said solenoid switches, whereby to control the generator output between predetermined limits.

3. An automatically controlled transmission mechanism comprising a base, a carriage longitudinally movable on said base, a cone provided with a knurled rubber friction surface mounted on said carriage, means including an extensible coupling for connecting said cone to a drive shaft, a generator mounted on said base, a disc provided with a knurled rubber friction surface keyed to the armature shaft of said generator and in frictional engagement with said cone, a motor mounted on said base and connected with said carriage so as to effect the longitudinal movement thereof in either direction and to thereby change the velocity ratio between the cone and the disc, circuits electrically coupling the generator to said motor, solenoid switches for controlling said circuits, a voltmeter switch electrically connected to and actuated by said generator, and circuits connecting the voltmeter switch for actuation of said solenoid switches, whereby to control the generator output between predetermined limits.

4. A transmission mechanism for controlling the relative velocity of a driven shaft with respect to a driving shaft, comprising a friction wheel connected to said driven shaft, a carriage parallelly movable with respect to said driven shaft, a cone shaft mounted diagonally on said carriage and driven through an extensible coupling connected to said driving shaft, a cone keyed on said cone shaft, in frictional contact with said friction wheel, a generator driven by said driven shaft, a motor driven by said generator adapted to effect the movement of said carriage, and a contact making voltmeter electrically connected with said generator and said motor adapted to control the operation of said motor to effect the movement of said carriage to control the output of said generator.

5. A transmission mechanism for controlling the relative velocity of a driven shaft with respect to that of a driving shaft, comprising a friction wheel keyed to said driven shaft, a carriage longitudinally movable with respect to the axis of said driven shaft, a cone mounted on said carriage in frictional contact with said friction wheel so that the contacting elements of said wheel and cone are parallel to the axis of said driven shaft, an extensible coupling and gears for transmitting rotation from said driving shaft to said cone, a generator coupled to said driven shaft, a motor driven by said generator and connected to said carriage to effect the longitudinal movement thereof, and means connected with said generator and said motor for controlling the actuation of said motor, whereby the velocity ratio of the driven shaft with respect to said driving shaft is changed to effect an output from said generator between predetermined limits.

CUYLER W. BROOKS.